United States Patent
Hu et al.

(10) Patent No.: US 9,547,943 B2
(45) Date of Patent: Jan. 17, 2017

(54) FRAMEWORK AND METHOD FOR CREATING VIRTUAL MODEL OF THREE-DIMENSIONAL SPACE

(71) Applicant: HON HAI PRECISION INDUSTRY CO., LTD., New Taipei (TW)

(72) Inventors: Min-Chun Hu, New Taipei (TW); Tse-Yu Pan, New Taipei (TW); Li-Yun Lo, New Taipei (TW); Hung-Yi Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/809,488

(22) Filed: Jul. 27, 2015

(65) Prior Publication Data

US 2016/0350980 A1    Dec. 1, 2016

(30) Foreign Application Priority Data

May 29, 2015    (TW) .............................. 104117342 A

(51) Int. Cl.
*G06T 19/20*        (2011.01)

(52) U.S. Cl.
CPC ....... *G06T 19/20* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 8,275,590 B2* | 9/2012 | Szymczyk | ......... | G06Q 30/0603 345/418 |
| 2002/0032546 A1* | 3/2002 | Imamura | ............ | G06Q 30/0601 703/1 |
| 2013/0084970 A1* | 4/2013 | Geisner | ................. | A63F 13/213 463/29 |
| 2014/0075737 A1* | 3/2014 | Jones | .................... | B64F 5/0009 29/525.01 |

FOREIGN PATENT DOCUMENTS

| | | | | |
|---|---|---|---|---|
| CA | 2842424 A1 * | 1/2013 | ............. | G06Q 50/01 |
| CN | 104268309 A | 1/2015 | | |
| TW | M439203 U1 | 10/2012 | | |
| TW | 201305964 A1 | 2/2013 | | |
| TW | 201401208 A | 1/2014 | | |

* cited by examiner

*Primary Examiner* — Ke Xiao
*Assistant Examiner* — Jed-Justin Imperial
(74) *Attorney, Agent, or Firm* — Zhigang Ma

(57) ABSTRACT

A framework for creating a virtual model of a three-dimensional space includes a server, a terminal device in communication with the server, at least one object supplier in communication with the server, and at least one social networking site in communication with the server. The server generates a three-dimensional space in response to receiving login information from the terminal device, generates at least one room located in a predefined coordinate space of the three-dimensional space, generates at least one object located in a predefined coordinate space of the at least one room, and creates the virtual model including the three-dimensional space, the at least one room in the three-dimensional space, and the at least one object in the at least one room, and displays the virtual model on the terminal device. The at least one object is purchasable from the at least one object supplier.

18 Claims, 6 Drawing Sheets

FRAMEWORK AND METHOD FOR CREATING VIRTUAL MODEL OF THREE-DIMENSIONAL SPACE

FIELD

The subject matter herein generally relates to interior design, and more particularly to a framework and a method for creating a virtual model of an interior space of a home.

BACKGROUND

Generally, when designing an interior space of a home, a designer needs to visit different stores to shop for furniture, appliances, and the like to furnish different rooms of the home. However, it may be difficult to know how to arrange the furniture and appliances in the home when the designer and the furniture and appliances are not already in the home.

BRIEF DESCRIPTION OF THE DRAWINGS

Implementations of the present technology will now be described, by way of example only, with reference to the attached figures.

DETAILED DESCRIPTION

Figure 1:
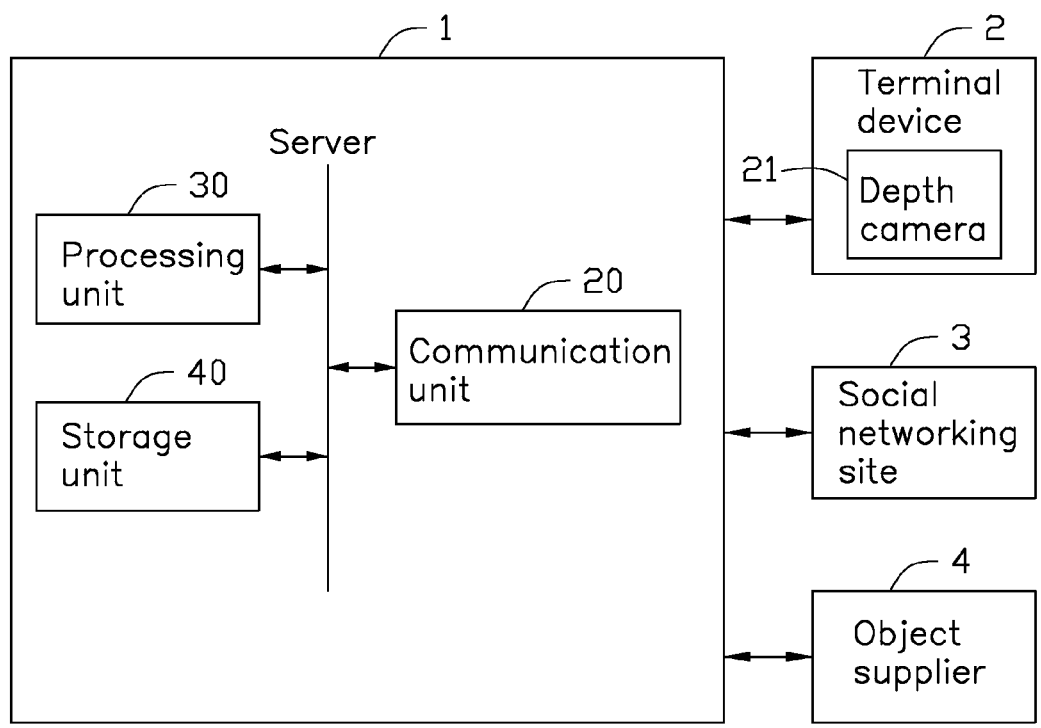
FIG. 1 is a block diagram of an embodiment of a framework for creating a virtual model of a three-dimensional space.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of a framework for creating a virtual model of a three-dimensional space. In at least one embodiment, the virtual model is a model of an interior space of a house. The framework can include a server 1 implementing a design system 10 (shown in FIG. 2), a terminal device 2, at least one social networking site 3, and at least one object supplier 4. The terminal device 2, the social networking site 3, and the object supplier 4 can each communicate with the server 1 through the communication unit 20. The communication unit 20 can communicate with the terminal device 2, the social networking site 3, and the object supplier 4 through the Internet, WIFI, or other suitable communication technology. The terminal device 2 can be a mobile phone, a tablet computer, or the like. The terminal device 2 can include a depth camera 21 for capturing three-dimensional images.

The server 1 can include a communication unit 20, a processing unit 30, and a storage unit 40. The communication unit 20 can communicate with the terminal device 2, the social networking site 3, and the object supplier 4. The server 1 can store login information of a user account accessed by the terminal device 2. The terminal device 2 can transmit the login information to the server 1 to implement the design system 10 for creating the virtual model.

Figure 2:
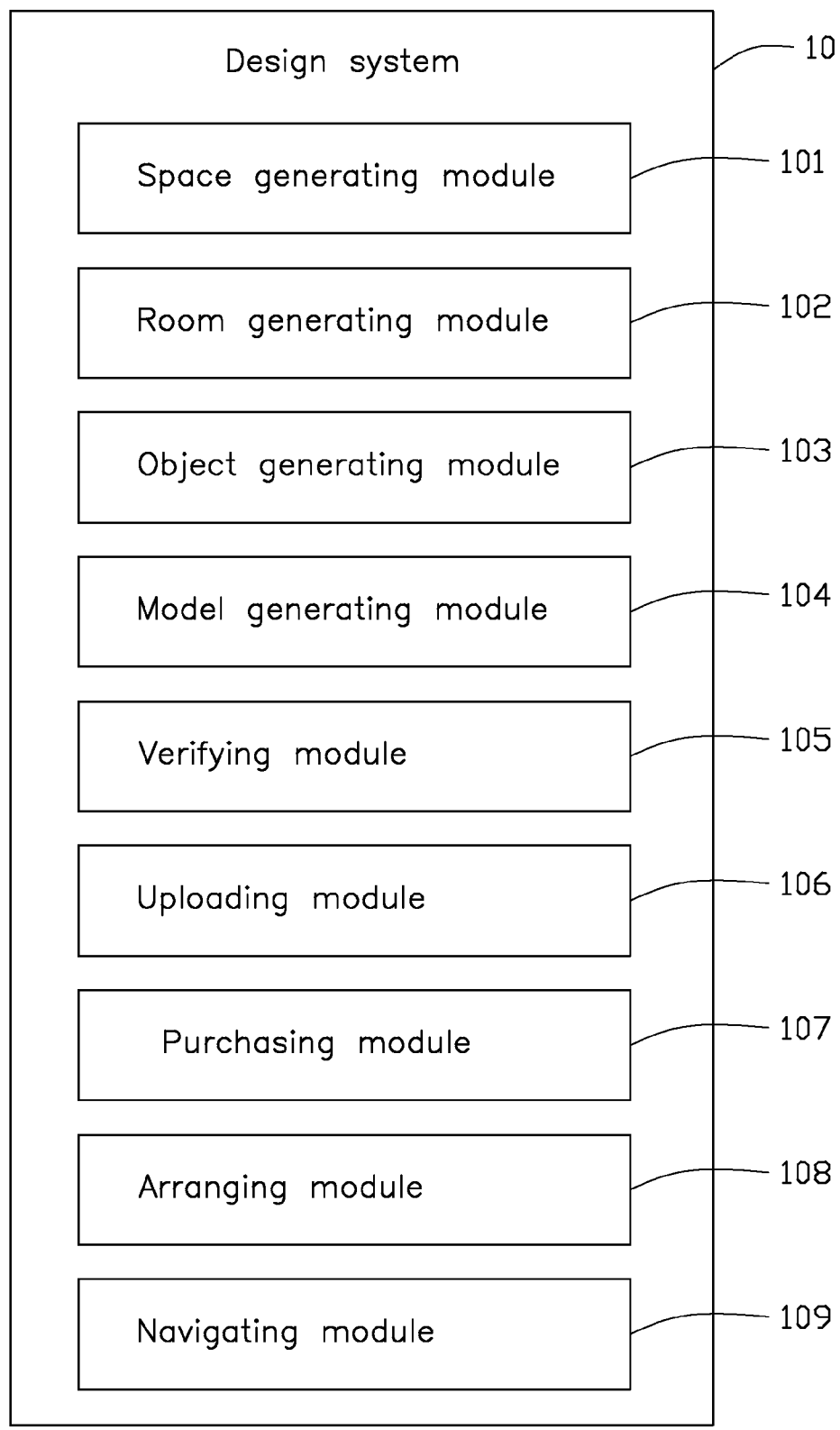
FIG. 2 is a block diagram of an embodiment of function modules of a design system implemented by a server of the framework.

Referring to FIG. 2, the design system 10 can include a plurality of modules, such as a space generating module 101, a room generating module 102, an object generating module 103, a model generating module 104, a verifying module 105, an uploading module 106, a purchasing module 107, an arranging module 108, and a navigating module 109. The modules 101-109 can include one or more software programs in the form of computerized codes stored in the storage unit 40. The computerized codes can include instructions executed by the processing unit 30 to provide functions for the modules 101-109.

Figure 3:
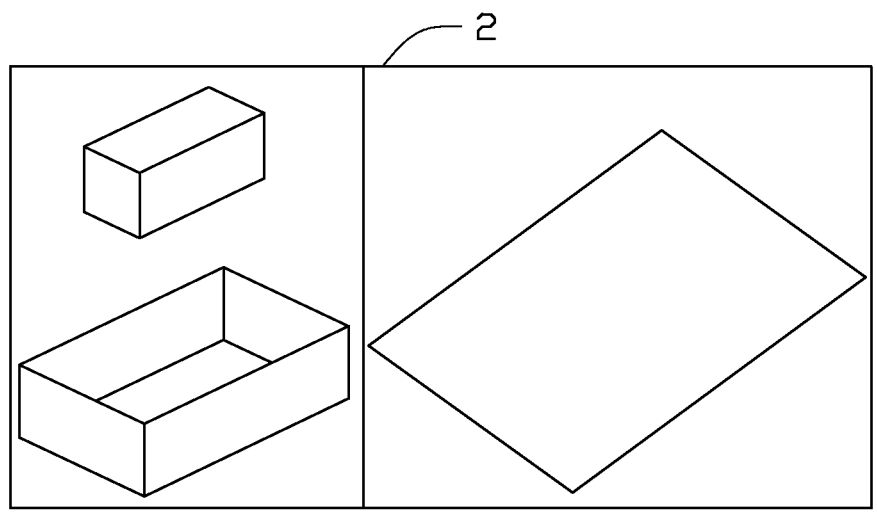
FIG. 3 is a diagrammatic view of an embodiment of a three-dimensional space generated by the server.

The verifying module 105 can verify the login information of the user account received from the terminal device 2. Referring to FIG. 3, when the login information is verified, the space generating module 101 can generate a three-dimensional space having predefined size dimensions for creating the virtual model. In at least one embodiment, the predefined size dimensions can include a length, a width, and a height. In other embodiments, the size dimensions can be inputted during a process of logging into the design system 10. The three-dimensional space can be transmitted to the terminal device 2 to display on the terminal device 2.

The room generating module 102 can generate at least one room located in a coordinate space of the three-dimensional space in response to receiving first user input from the terminal device 2. For example, the room can be a bedroom, a living room, a kitchen, or the like. In at least one embodiment, the first user input can be at least one of the following: capturing, by the depth camera 21, one or more images of the at least one room;

inputting, in a corresponding input field displayed on the terminal device 2 by the design system 10, size dimensions of the at least one room; and selecting, from a corresponding interface provided on the terminal device 2 by the design system 10, one or more sample room images from a plurality of sample room images. The size dimensions of the room captured by the depth camera 21 can be obtained from the one or more images captured by the depth camera 21. The size dimensions of the room input in the corresponding input field can include a length, a width, and a height of the room. The plurality of sample room images can be stored in the storage unit 40 and include hand-drawn images, stock file images of the design system 10, images captured by the depth camera 21, and images from other sources. The size dimensions of the room in the one or more sample room images can be obtained from the one or more sample room images or inputted to a corresponding input field.

The object generating module 103 can generate at least one object in the at least one room in response to receiving second user input from the terminal device 2. For example, the at least one object can be a lamp, a television, a bookcase, a microwave, or the like. In at least one embodiment, the second user input can include at least one of the following:

capturing, by the depth camera 21, one or more images of the at least one object;

inputting, in a corresponding interface provided by the design system 10, information of the at least one object;

selecting, from a corresponding interface provided by the design system 10, one or more sample object images from a plurality of sample object images;

selecting, from a corresponding interface provided by the design system 10, one or more pre-arranged room models designed by a plurality of designers, each pre-arranged room model including at least one object pre-arranged in the at least one room; and selecting, from a corresponding interface provided by the design system 10, one or more design options from a plurality of design options.

The design system 10 can generate one or more three-dimensional images corresponding to the one or more images of the at least one object captured by the depth camera 21. The plurality of sample object images can be stored in the storage unit 40 and include images captured by the depth camera 21 and a plurality of images from other sources. When the information of the at least one object is inputted in the corresponding interface, the design system 10 can search for the at least one object from the object supplier 4 according to the inputted information. For example, the information of the object can include an object description, a name of the object, a supplier of the object, or the like. The design system 10 can provide a plurality of search results to be selected, and generate a three-dimensional image of the selected objects. The plurality of room design options can include a designer option, a room type option, a room size option, an object price option, and the like. The storage unit 40 can store a plurality of room models designed by a plurality of designers. For example, when the designer option is selected, the room generating module 102 can generate one of the room models designed by the corresponding selected designer.

The model generating module 104 can create the virtual model in response to receiving third user input from the terminal device 2. The virtual model can include the at least one room and the at least one object. In at least one embodiment, the third user input can include at least one of the following:

dragging an image of the at least one room and the at least one object to the three-dimensional space;

applying touch input on an image of the three-dimensional space, the image of the at least one room, and an image of the at least one object;

selecting an option to automatically arrange the at least one object and the at least one room in the three-dimensional space according to an arrangement method of the design system 10; and selecting an option to arrange the at least one object and the at least one room in the three-dimensional space according to one of the pre-arranged room models.

The arranging module 108 can arrange the at least one room and the at least one object in the three-dimensional space according to the arrangement method. In at least one embodiment, the arrangement method can be stored in the storage unit 40 and adjusted according to the user account. For example, the arranging module 108 can record a history of all previously created virtual models and a history of all previously chosen designers of the user account. The arranging module 108 can determine the arrangement of the at least one object and the at least one room in the three-dimensional space according to the histories. In another embodiment, the arranging module 108 can record a plurality of user-defined rules for arranging the at least one room and the at least one object in the three-dimensional space. For example, the plurality of user-defined rules can include arranging the at least one room and the at least one object according to fengshui, matching colors, symmetry, or the like.

Figure 4:
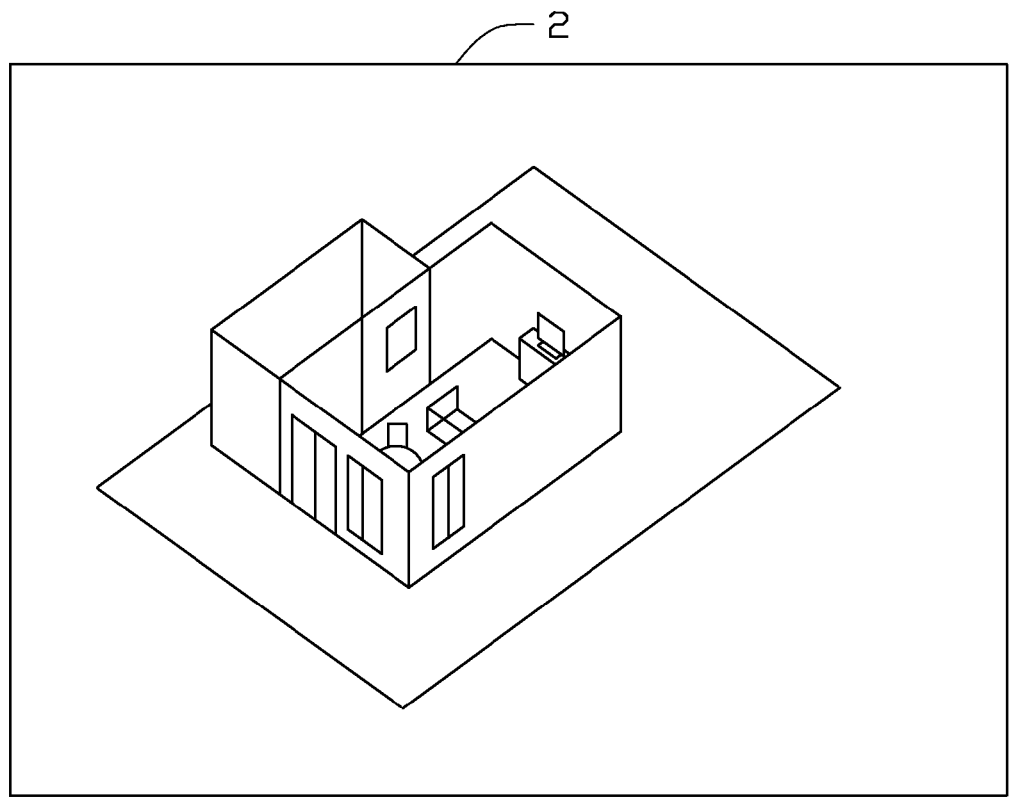
FIG. 4 is a diagrammatic view of an embodiment of a virtual model.

Referring to FIG. 4, the model generating module 104 can generate the virtual model, and display the virtual model on the terminal device 2. In at least one embodiment, the model generating module 104 can provide a confirmation message to the terminal device 2 to accept or reject the virtual model.

The uploading module 106 can upload the virtual model to the at least one social networking site 3, and provide a corresponding interface to receive user feedback about the virtual model.

The purchasing module 107 can provide the at least one object for purchase. In at least one embodiment, the purchasing module 107 can search the at least one object supplier 4 to provide a list of objects from the at least one object supplier 4 on a corresponding interface on the terminal device 2, and one or more objects can be selected from the list of objects to be purchased.

Figure 5:
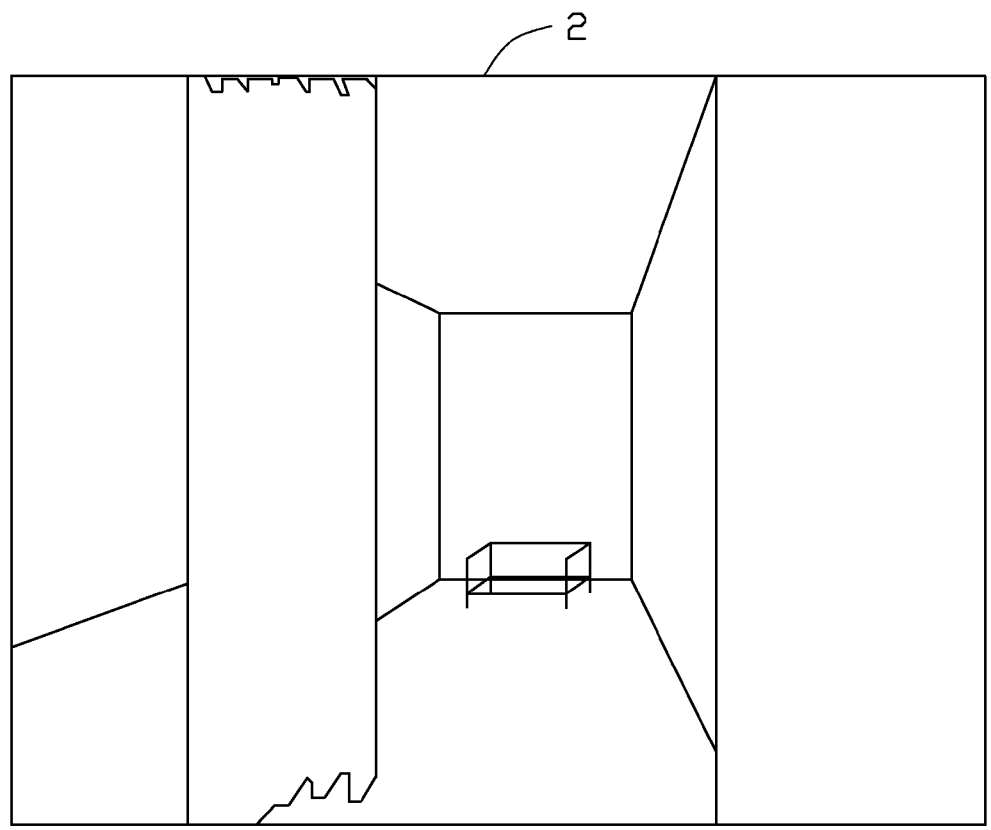
FIG. 5 is a diagrammatic view of the virtual model of FIG. 4 viewed as a spatial model.

Referring to FIG. 5, the navigating module 109 can provide a corresponding interface on the terminal device 2 for navigating the virtual model when the virtual model is viewed as the spatial model and navigate the virtual model according to user input.

Figure 6:
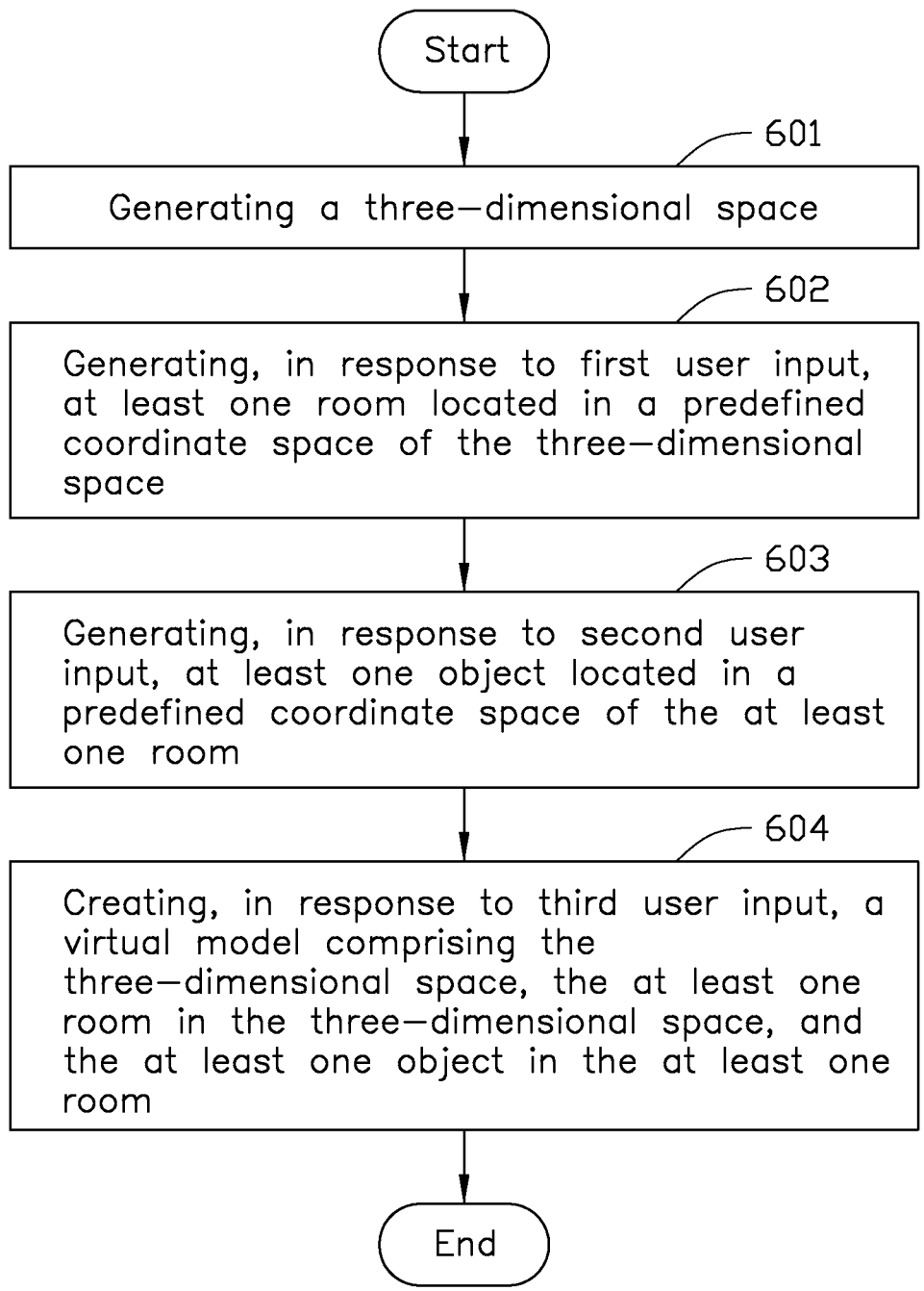
FIG. 6 is a flowchart of an embodiment of a method for creating a virtual model of a three-dimensional space.

FIG. 6 illustrates a flowchart of an exemplary method for creating a virtual model of a three-dimensional space. The example method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 601.

At block 601, a three-dimensional space can be generated by a server in response to receiving login information of a user account accessed by a terminal device. The three-dimensional space can have predefined size dimensions for creating the virtual model. In at least one embodiment, the predefined size dimensions can include a length, a width, and a height. In other embodiments, the size dimensions can be inputted during a process of logging into the design system. The three-dimensional space can be transmitted to the terminal device to display on the terminal device.

At block 602, at least one room located in a predefined coordinate space of the three-dimensional space can be generated by the server in response to receiving first user input. For example, the room can be a bedroom, a living room, a kitchen, or the like. In at least one embodiment, the first user input can be at least one of the following:

capturing, by a depth camera of the terminal device, one or more images of the at least one room;

inputting, in a corresponding input field displayed on the terminal device, size dimensions of the at least one room; and selecting, from a corresponding interface provided on the terminal device, one or more sample room images from a plurality of sample room images. The size dimensions of the room captured by the depth camera can be obtained from the one or more images captured by the depth camera. The size dimensions of the room input in the corresponding input field can include a length, a width, and a height of the room. The plurality of sample room images can be stored in the server and include hand-drawn images, stock file images, images captured by the depth camera, and images from other sources. The size dimensions of the room in the one or more sample room images can be obtained from the one or more sample room images or inputted to a corresponding input field.

At block 603, at least one object located in a predefined coordinate space of the at least one room can be generated in response to receiving second user input. For example, the at least one object can be a lamp, a television, a bookcase, a microwave, or the like. In at least one embodiment, the second user input can include at least one of the following:

capturing, by the depth camera, one or more images of the at least one object;

inputting, in a corresponding interface, information of the at least one object;

selecting, from a corresponding interface, one or more sample object images from a plurality of sample object images;

selecting, from a corresponding interface, one or more pre-arranged room models designed by a plurality of designers, each pre-arranged room model including at least one object pre-arranged in the at least one room; and selecting, from a corresponding interface, one or more design options from a plurality of design options.

The server can generate one or more three-dimensional images corresponding to the one or more images of the at least one object captured by the depth camera. The plurality of sample object images can be stored in the storage unit and include images captured by the depth camera and a plurality of images from other sources. When the information of the at least one object is inputted in the corresponding interface, the server can search for the at least one object from at least one object supplier in communication with the server according to the inputted information. For example, the information of the object can include an object description, a name of the object, a supplier of the object, or the like. The server can provide a plurality of search results to be selected, and generate a three-dimensional image of the selected objects. The plurality of room design options can include a designer option, a room type option, a room size option, an object price option, and the like. The storage unit can store a plurality of room models designed by a plurality of designers. For example, when the designer option is selected, the room generating module can generate one of the room models designed by the corresponding selected designer.

At block 604, the virtual model comprising the three-dimensional space, the at least one room in the three-dimensional space, and the at least one object in the at least one room can be generated by the server in response to receiving third user input, and the virtual model can be displayed on the terminal device. In at least one embodiment, the third user input can include at least one of the following:

dragging an image of the at least one room and the at least one object to the three-dimensional space;

applying touch input on an image of the three-dimensional space, the image of the at least one room, and an image of the at least one object;

selecting an option to automatically arrange the at least one object and the at least one room in the three-dimensional space according to an arrangement method of the design system; and selecting an option to arrange the at least one object and the at least one room in the three-dimensional space according to one of the pre-arranged room models.

In at least one embodiment, the arrangement method can be stored in a storage unit of the server and adjusted according to the user account. For example, the server can record a history of all previously created virtual models and a history of all previously chosen designers of the user account. The server can determine the arrangement of the at least one object and the at least one room in the three-dimensional space according to the histories. In another embodiment, the server can record a plurality of user-defined rules for arranging the at least one room and the at least one object in the three-dimensional space. For example, the plurality of user-defined rules can include arranging the at least one room and the at least one object according to fengshui, matching colors, symmetry, or the like.

In at least one embodiment, the server can provide a confirmation message to the terminal device to accept or reject the virtual model.

The server can upload the virtual model to at least one social networking site in communication with the server, and provide a corresponding interface to receive user feedback about the virtual model.

The server can communicate with the at least one object supplier to provide the at least one object for purchase. In at least one embodiment, the server can provide a list of objects searched from the at least one object supplier, and one or more objects can be selected from the list of objects to be purchased.

The server can provide a corresponding interface for navigating the virtual model when the virtual model is viewed as a spatial model, and navigate the virtual model according to user input.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for creating a virtual model of a three-dimensional space, the method comprising:
   generating, by a design system executed by a server, a three-dimensional space having predefined size dimensions;
   generating, by the design system in response to first user input, at least one room located in a coordinate space of the three-dimensional space;
   generating, by the design system in response to second user input, at least one object located in a coordinate space of the at least one room;
   creating, by the design system in response to third user input, the virtual model comprising the three-dimensional space, the at least one room in the three-dimensional space, and the at least one object in the at least one room, and displaying the virtual model on the terminal device;
   wherein the third user input comprises selecting an option to automatically arrange the at least one object and the at least one room in the three-dimensional space according to an arrangement method of the design system;
   wherein the arrangement method comprises recording a history of all previously created virtual models and a history of all previously chosen designers of the user account, recording a plurality of user-defined rules for arranging the at least one room and the at least one object in the three-dimensional space, and determining the arrangement of the at least one object and the at least one room in the three-dimensional space according to the histories and the plurality of user-defined rules.

2. The method as in claim 1, wherein:
   the server stores login information of a user account accessed by a terminal device in communication with the server and provides a corresponding interface for the terminal device to log into the design system; and
   the three-dimensional space is generated in response to the design system receiving the login information from the terminal device.

3. The method as in claim 1, wherein:
   the virtual model is viewable on the terminal device as a planar model and a spatial model; and
   the spatial model is navigable by selecting a navigating option provided by the design system on the terminal device.

4. The method as in claim 1 further comprising:
   uploading, by the design system, the virtual model to a social networking site in communication with the server, and providing a corresponding interface for receiving user feedback about the virtual model; and
   providing, by the design system, an interface for purchasing the at least one object from at least one object supplier in communication with the server.

5. The method as in claim 1, wherein the first user input comprises at least one of:
   capturing, by a depth camera, one or more images of the at least one room;
   inputting, in a corresponding input field displayed on the terminal device by the design system, size dimensions of the at least one room; and
   selecting, from a corresponding interface provided on the terminal device by the design system, one or more sample room images from a plurality of sample room images.

6. The method as in claim 5, wherein:
   the size dimensions input in the corresponding input field comprise a length, a width, and a height of the at least one room;
   size dimensions of the at least one room captured by the depth camera are obtained from the one or more images captured by the depth camera;
   the plurality of sample room images comprises hand-drawn images, stock file images, images captured by the depth camera, and images from other sources; and
   size dimensions of the at least one room in the one or more sample room images are obtained from the one or more sample room images or inputted to a corresponding input field.

7. The method as in claim 1, wherein the second user input comprises at least one of:
   capturing, by the depth camera, one or more images of the at least one object;
   inputting, in a corresponding interface provided by the design system, information of the at least one object;
   selecting, from a corresponding interface provided by the design system, one or more sample object images from a plurality of sample object images;
   selecting, from a corresponding interface provided by the design system, one or more pre-arranged room models designed by a plurality of designers, each pre-arranged room model comprising at least one object pre-arranged in the at least one room; and
   selecting, from a corresponding interface provided by the design system, one or more design options from a plurality of design options.

8. The method as in claim 7, wherein:
   the design system generates one or more three-dimensional images corresponding to the one or more images of the at least one object captured by the depth camera;
   the design system searches for the at least one object from the corresponding at least one object supplier according to the inputted information, provides a plurality of search results to be selected, and generates a three-dimensional image of the selected at least one object;
   the plurality of sample object images comprises images captured by the depth camera and a plurality of images from other sources; and
   the plurality of room design options comprises a designer option, a room type option, a room size option, and an object price option.

9. The method as in claim 1, wherein the third user input further comprises at least one of:
   dragging an image of the at least one room and the at least one object to the three-dimensional space;
   applying touch input on an image of the three-dimensional space, the image of the at least one room, and an image of the at least one object;
   selecting an option to arrange the at least one object and the at least one room in the three-dimensional space according to the pre-arranged room model.

10. A framework for creating a virtual model of a three-dimensional space, the framework comprising:
    a server implementing a design system for creating the virtual model;
    a terminal device in communication with the server;
    at least one object supplier in communication with the server, the at least one object supplier configured to provide the at least one object in the virtual model, and further configured to provide the at least one object for purchase; and at least one social networking site in communication with the server, the virtual model being uploaded to the social networking site;

wherein the design system is configured to:

generate a three-dimensional space having predefined size dimensions;

generate, in response to first user input, at least one room located in a predefined coordinate space of the three-dimensional space;

generate, in response to second user input, at least one object located in a predefined coordinate space of the at least one room;

create, in response to third user input, the virtual model comprising the three-dimensional space, the at least one room in the three-dimensional space, and the at least one object in the at least one room, and display the virtual model on the terminal device;

wherein the third user input comprises selecting an option to automatically arrange the at least one object and the at least one room in the three-dimensional space according to an arrangement method of the design system;

wherein the arrangement method comprises recording a history of all previously created virtual models and a history of all previously chosen designers of the user account, recording a plurality of user-defined rules for arranging the at least one room and the at least one object in the three-dimensional space, and determining the arrangement of the at least one object and the at least one room in the three-dimensional space according to the histories and the plurality of user-defined rules.

11. The framework as in claim 10, wherein:

the terminal device comprises a depth camera configured to capture three-dimensional images;

the design system provides a corresponding interface to the terminal device for inputting login information of a user account accessed by the terminal device; and the design system generates the three-dimensional room in response to receiving the login information from the terminal device.

12. The framework as in claim 11, wherein:

the virtual model is viewable on the terminal device as a planar model and a spatial model; and the spatial model is navigable by selecting a navigating option provided by the design system on the terminal device.

13. The framework as in claim 12, wherein the first user input comprises at least one of:

capturing, by the depth camera, one or more images of the at least one room;

inputting, in a corresponding input field displayed on the terminal device by the design system, size dimensions of the at least one room; and selecting, from a corresponding interface provided on the terminal device by the design system, one or more sample room images from a plurality of sample room images.

14. The framework as in claim 13, wherein:

the size dimensions input in the corresponding input field comprise a length, a width, and a height of the at least one room;

size dimensions of the at least one room captured by the depth camera are obtained from the one or more images captured by the depth camera;

the plurality of sample room images comprises hand-drawn images, stock file images, images captured by the depth camera, and images from other sources; and size dimensions of the at least one room in the one or more sample room images are obtained from the one or more sample room images or inputted to a corresponding input field.

15. The framework as in claim 14, wherein the second user input comprises at least one of:

capturing, by the depth camera, one or more images of the at least one object;

inputting, in a corresponding interface provided by the design system, information of the at least one object;

selecting, from a corresponding interface provided by the design system, one or more sample object images from a plurality of sample object images;

selecting, from a corresponding interface provided by the design system, one or more pre-arranged room models designed by a plurality of designers, each pre-arranged room model comprising at least one object pre-arranged in the at least one room; and selecting, from a corresponding interface provided by the design system, one or more design options from a plurality of design options.

16. The framework as in claim 15, wherein:

the design system generates one or more three-dimensional images corresponding to the one or more images of the at least one object captured by the depth camera;

the design system searches for the at least one object from the corresponding at least one object supplier according to the inputted information, provides a plurality of search results to be selected, and generates a three-dimensional image of the selected at least one object;

the plurality of sample object images comprises images captured by the depth camera and a plurality of images from other sources; and the plurality of room design options comprises a designer option, a room type option, a room size option, and an object price option.

17. The framework as in claim 1, wherein the third user input further comprises at least one of:

dragging an image of the at least one room and the at least one object to the three-dimensional space;

applying touch input on an image of the three-dimensional space, the image of the at least one room, and an image of the at least one object;

selecting an option to arrange the at least one object and the at least one room in the three-dimensional space according to the pre-arranged room model.

18. The framework as in claim 17, wherein:

the server comprises:

a communication unit configured to communicate with the terminal device, the at least one social networking site, and the at least one object supplier;

a storage unit configured to store a plurality of instructions of a plurality of modules of the design system, and further store a plurality of object samples, the arrangement method for automatically arranging the at least one object and the at least one room in the three-dimensional space, the plurality of room models of the plurality of designers, and the login information of the user account accessed by the terminal device; and a processing unit configured to execute the plurality of instructions of the plurality of modules of the design system; and the plurality of modules of the design system comprises:
a space generating module configured to generate the three-dimensional space in response to receiving the login information;
a room generating module configured to generate the at least one room in response to receiving the first user input;
an object generating module configured to generate the at least one object in response to receiving the second user input;
a model generating module configured to generate the virtual model in response to receiving the third user input;
a verifying module configured to verify the login information with the login information stored in the storage unit;
an uploading module configured to upload the virtual model to the at least one social networking site, and provide a corresponding interface on the social networking site for receiving user feedback about the virtual model;
a purchasing module configured to provide a corresponding interface to the terminal device for purchasing the at least one object from the at least one object supplier;
an arranging module configured to arrange the at least one room and the at least one object according to the arrangement method stored in the storage unit; and
a navigating module configured to provide a corresponding interface for navigating the virtual model when the virtual model is viewed as the spatial model, and navigate the virtual model according to user input.

* * * * *